US010642241B2

(12) United States Patent
Chen et al.

(10) Patent No.: US 10,642,241 B2
(45) Date of Patent: May 5, 2020

(54) SYSTEMS, METHODS AND APPARATUS FOR IMPROVED GENERATION CONTROL OF MICROGRID ENERGY SYSTEMS

(71) Applicant: Siemens Industry, Inc., Alpharetta, GA (US)

(72) Inventors: Dingguo Chen, Eden Prairie, MN (US); Ram P. Chinchali, Cupertino, CA (US); Shashank Pande, Maple Grove, MN (US)

(73) Assignee: SIEMENS AKTIENGESELLSCHAFT, München (DE)

( * ) Notice: Subject to any disclaimer, the term of this patent is extended or adjusted under 35 U.S.C. 154(b) by 292 days.

(21) Appl. No.: 14/823,429

(22) Filed: Aug. 11, 2015

(65) Prior Publication Data
US 2016/0313716 A1  Oct. 27, 2016

Related U.S. Application Data

(60) Provisional application No. 62/150,888, filed on Apr. 22, 2015.

(51) Int. Cl.
G05B 19/042 (2006.01)
H02J 3/38 (2006.01)
H02J 4/00 (2006.01)

(52) U.S. Cl.
CPC .......... G05B 19/0428 (2013.01); H02J 3/38 (2013.01); H02J 3/381 (2013.01); H02J 3/383 (2013.01);
(Continued)

(58) Field of Classification Search
CPC ......... G05B 19/0428; G05B 2219/2639; H02J 4/00; H02J 3/38; H02J 3/383; H02J 3/381;
(Continued)

(56) References Cited

U.S. PATENT DOCUMENTS 6,819,087 B2    11/2004  Delmerico et al.
9,300,137 B2 *   3/2016  Cherian ................ H02J 3/00
(Continued)

FOREIGN PATENT DOCUMENTS

EP   2325970 A2   5/2011
EP   2701261 A1   2/2014
(Continued)

OTHER PUBLICATIONS

PCT Search Report dated Aug. 2, 2016 corresponding to PCT Application No. PCT/US2016/028551 filed Apr. 21, 2016 (18 pages).

Primary Examiner — James J Lee
Assistant Examiner — Shon G Foley

(57) ABSTRACT

Embodiments provide systems, methods and apparatus for improved generation control for microgrids. Embodiments include providing a microgrid management system (MGMS) having a smart generation control (SGC) system in communication with a plurality of resources and loads, wherein the resources and loads are coupled to a microgrid transmission line that is couplable to a macrogrid transmission line; performing preprocessing of the resources; determining current frequency, interchange, schedule, and area control error (ACE); monitoring and controlling the microgrid based on a system mode, a control mode, and system status; deriving a set point for active power control of resources; and transmitting control commands. Numerous other aspects are provided.

20 Claims, 7 Drawing Sheets

(52) U.S. Cl.
CPC ........ *H02J 4/00* (2013.01); *G05B 2219/2639* (2013.01); *H02J 3/388* (2020.01); *Y02E 10/563* (2013.01); *Y02E 60/74* (2013.01); *Y02P 80/11* (2015.11); *Y04S 10/30* (2013.01)

(58) Field of Classification Search
CPC .. H02J 2003/388; Y02E 60/74; Y02E 10/563; Y04S 10/30
See application file for complete search history.

(56) References Cited

U.S. PATENT DOCUMENTS

| | | | |
|---|---|---|---|
| 2011/0248569 A1* | 10/2011 | Son | H02J 3/381 307/87 |
| 2014/0100705 A1 | 4/2014 | Shi et al. | |
| 2014/0277599 A1* | 9/2014 | Pande | G06Q 50/06 700/22 |
| 2014/0306534 A1 | 10/2014 | Shi et al. | |
| 2016/0266559 A1* | 9/2016 | Shi | G05B 19/042 |

FOREIGN PATENT DOCUMENTS

| | | |
|---|---|---|
| EP | 2736144 A1 | 5/2014 |
| EP | 2773007 A1 | 9/2014 |
| WO | 2014024456 A1 | 2/2014 |
| WO | 2015048737 A1 | 4/2015 |

\* cited by examiner

SYSTEMS, METHODS AND APPARATUS FOR IMPROVED GENERATION CONTROL OF MICROGRID ENERGY SYSTEMS

RELATED APPLICATIONS

The present application claims priority to U.S. Provisional Application No. 62/150,888 titled "SMART GENERATION CONTROL FOR MICROGRIDS" filed Apr. 22, 2015, which is incorporated herein by reference for all purposes.

FIELD

The present invention relates to operating microgrid energy systems, and more specifically to improved generation control of such systems.

BACKGROUND

A microgrid is a localized grouping of interconnected electricity sources (e.g., distributed renewable energy resources) and loads that normally operate connected to, and synchronous with, the traditional centralized grid (macrogrid), but can disconnect and function autonomously as physical and/or economic conditions dictate. A microgrid exists within clearly defined electrical boundaries and acts as a single controllable entity with respect to an external distribution power macrogrid. Microgrids are typically comprised of energy generating/consuming resources such as natural gas turbines, wind turbines, photovoltaic (PV) cells, combined heat and power (CHP) units, diesel generators, energy storage systems (e.g., batteries, flywheels, etc.), electric vehicles (EV), fuel cells, etc.

A microgrid may continuously operate in either grid connected mode or island mode. The most salient feature of a microgrid is its ability to isolate itself from the distribution power macrogrid when the distribution power macrogrid is experiencing disturbances or blackouts, thereby seamlessly transitioning to islanded mode operation.

With the use of distributed generation including renewable generation, a significant reduction of carbon dioxide emissions can be achieved as well. Hence, microgrids can maximize the benefits of "clean" distributed generation and supply electricity to its load during power outages of the distribution power grid.

Like traditional control centers equipped with Energy Management Systems (EMS), a microgrid can be empowered by a MicroGrid Management System (MGMS). The MGMS is a programmed, networked computer system, including sensors and actuators, that is responsible for monitoring the microgrid's generation, load, connectivity to the distribution power grid, interchange with the distribution power grid, and its voltage level. In addition, the MGMS can be responsible for taking required control actions to maintain power balance, following desired interchange requirements, maintaining voltage within a desired range, achieving optimal economics, and respecting emission constraints.

Conventionally, most of these tasks are performed by a key EMS component called the Automatic Generation Control (AGC) application suite. These tasks are typically coordinated in real-time via human intervention by dispatchers monitoring the power grid on a 24 hours per day, 7 days a week (24×7) basis. In contrast, a microgrid equipped with a MGMS would ideally function seamlessly in an unsupervised manner under various conditions without dedicated operators having to continuously monitor the microgrid to take control actions.

Thus, there is a need to enable the MGMS with the capability of continuously evaluating the microgrid's operating conditions, and automatically implementing desired control actions in a timely manner when necessary, thereby alleviating the need for a 24×7 operator monitoring or controlling the system. Therefore, what is needed are systems, methods and apparatus for improved generation control of microgrid energy systems.

SUMMARY

In some embodiments, a method for improved generation control for microgrids is provided. The method includes providing a microgrid management system (MGMS) having a smart generation control (SGC) system in communication with a plurality of resources and loads, wherein the resources and loads are coupled to a microgrid transmission line that is couplable to a macrogrid transmission line; performing preprocessing of the resources; determining current frequency, interchange, schedule, and area control error (ACE); monitoring and controlling the microgrid based on a system mode, a control mode, and system status; deriving a set point for active power control of resources; and transmitting control commands.

In other embodiments, a microgrid management system (MGMS) is provided. The system includes a process controller; a memory coupled to the process controller and storing instructions executable on the process controller, the instructions operable to provide a smart generation control (SGC) system for use with a plurality of resources and loads, wherein the resources and loads are coupled to a microgrid transmission line that is couplable to a macrogrid transmission line; perform preprocessing of the resources; determine current frequency, interchange, schedule, and area control error (ACE); monitor and controlling the microgrid based on a system mode, a control mode, and system status; derive a set point for active power control of resources; and transmit control commands.

In still other embodiments, a microgrid system is provided. The system includes a microgrid management system including a smart generation control application and a smart generation dispatch application; a plurality of resources coupled to the microgrid management system; a microgrid transmission line coupled to the plurality of resources; and a plurality of loads coupled to the microgrid transmission line. Under the control of the smart generation control application, the microgrid transmission line is adapted to be coupled to and decoupled from a macrogrid transmission line at a single point. The microgrid system is adapted to operate in a grid connected mode when the microgrid transmission line is coupled to the macrogrid transmission line. The microgrid system is adapted to operate in an island mode when the microgrid transmission line is not coupled to the macrogrid transmission line.

Numerous other aspects are provided in accordance with these and other aspects of the invention. Other features and aspects of the present invention will become more fully apparent from the following detailed description, the appended claims and the accompanying drawings.

DESCRIPTION

Figure 1:
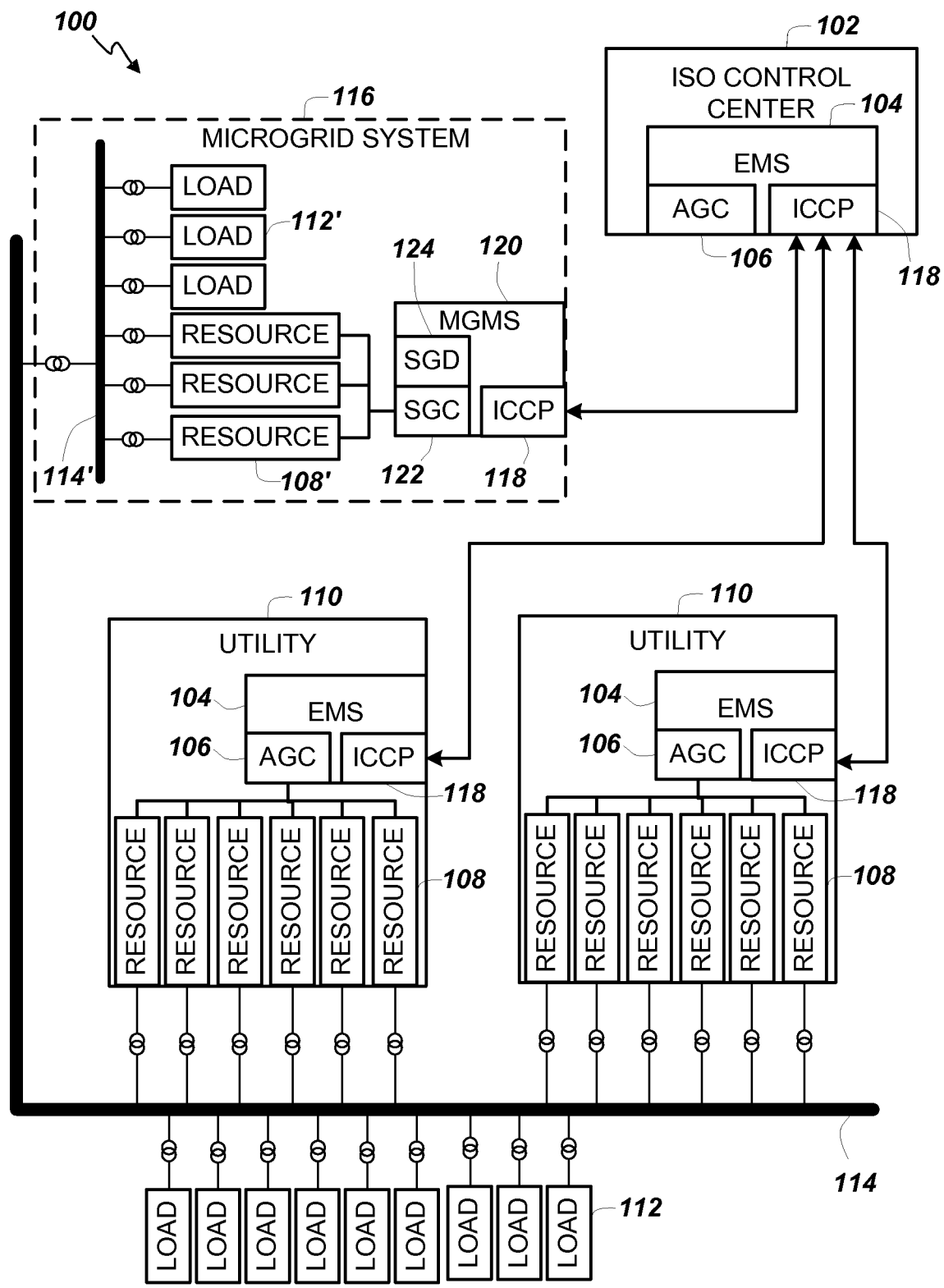
FIG. 1 is a block diagram depicting a microgrid system coupled to an external distribution power macrogrid according to embodiments of the present invention.

Embodiments of the present invention provide systems, apparatus and methods for an improved microgrid management system (MGMS). Embodiments of the present invention include software applications and systems adapted to provide an enhanced "smart" generation control (SGC) and "smart" generation dispatch (SGD) system. The SGC and SGD features of the MGMS described herein empower a microgrid with the ability to continuously evaluate the microgrid's operating conditions, and automatically implement desired control actions in a timely manner when necessary thereby alleviating the need for 24×7 human operator monitoring or control.

These enhanced generation control and dispatch features support intelligent control of distributed generation irrespective of the microgrid's mode of operation: macrogrid connected, islanded (i.e., macrogrid disconnected), or in a transition state between macrogrid connected and island mode. In addition, numerous additional features are provided. The SGC provides the ability to operate a microgrid in various control modes including constant interchange mode, constant frequency mode, and supervisory control mode.

Constant interchange mode is for use in the macrogrid connected mode of operation where the microgrid's generation is controlled to regulate the interchange flow with the external distribution power macrogrid. Constant frequency mode is for use in the islanded mode of operation where the microgrid's generation is controlled to regulate the frequency. The supervisory control mode is for use whenever it is desired that the microgrid's generation follows economic or emission optimized schedules or operate at a prescribed setpoint.

The SGC of embodiments of the present invention provides the ability to control distributed renewable generating assets (as well as conventional generating unit types) such as, for example, wind turbine units, solar photovoltaic (PV) systems, energy storage systems (ESS), fuel cell units, micro turbine units, diesel units, and combined heat & power units. Further, embodiments of the SGC provides the ability to selectively control one or more distributed generating resource to follow economic or emission optimized schedules, regulate for frequency or interchange, or follow variations in microgrid load by the use of designated load-following resources.

In some embodiments, the SGC provides the ability to selectively control one or more distributed generating resource to provide support for voltage regulation via voltage set point, reactive power set point, or constant power factor mode of control. In addition, embodiments provide the ability to control PV solar resources for Maximum Power Point Tracking (MPPT). MPPT is a technique that charge controllers use for wind turbines and PV solar systems to employ and maximize power output. The SGC can provide Automatic Voltage Control (AVC) to regulate interconnect bus voltage to within the desired voltage range.

In some other embodiments, the SGC of the present invention can calculate active and reactive reserves from resources for the purpose of maintaining specified amounts of responsive reserve, regulating reserve, and reactive reserve. Embodiments support automated seamless transitioning from macrogrid-connected to island mode and resynchronization back to the external distribution power macrogrid when feasible. Embodiments also support discharge/charge management of ESS resources to ensure proper charging/discharging of such resources based on their actual State of Charge (SOC).

In yet other embodiments, the SGC and SGD systems of the present invention support optimized commitment and real-time dispatch of microgrid resources to enable enforcement of economics, emission, or reserve constraints in supervisory mode. The optimization can be based on the resources' operational limits and response rates, prohibited regions of operation, incremental Heat Rate curves, charge/discharge characteristics curves, state of charge, power outputs, reactive power capability, PV and wind generation forecasts, microgrid load projection, and interchange schedules.

In a typical Energy Management System (EMS) for a macrogrid, the main objectives of a conventional Automatic Generation Control (AGC) are to regulate the active power output of generating units; maintain the desired net interchange; maintain interconnected system frequency; dispatch generating units in an optimal manner to minimize production cost; and both monitor and maintain sufficient available system reserves to meet system reserve requirements. These functions are required by power utilities or Independent System Operators (ISO) on the transmission level to deliver generation from power plants to remote load centers through the transmission network. FIG. 1 depicts an example energy delivery system 100 according to embodiments of the present invention. Independent System Operators (ISO) operate control centers 102 that can include an EMS 104. The EMS 104 can include a number of hardware and software components for monitoring, controlling, and optimizing the performance (e.g., in terms of minimizing cost, maximizing efficiency, and maximizing reliability) of the generation and transmission of the energy delivery system 100.

The EMS 104 includes an automatic generation control (AGC) system 106 for adjusting the power output of multiple resources 108 (e.g., generators) at different power plants (e.g., utilities 110, independent power producers (IPP) and/or non-utility generators (NUG), etc.), in response to changes in the load created by consumers of the electricity (e.g., loads 112). The generated power is delivered from the resources 108 to consumers via macrogrid transmission lines 114. Note that the utilities 110 can include an EMS 104 with an AGC system 106. A microgrid system 116 can also be couplable to the macrogrid transmission lines 114. Appropriate transformers, switches, and circuit breakers can be used to allow the microgrid system 116 to connect and disconnect from the macrogrid transmission lines 114 on command.

In some embodiments, EMS 104 further includes one or more Utility Communication Servers that each provide an implementation of an Inter-Control Center Communication Protocol (ICCP) 118 that enables communication with, for example, other EMSs in operation at, for example, several utilities 110. In some embodiments, ICCP 118 can be used to implement remote control of resources 108 by implementing AGC system 106 communications between different EMSs. The EMS 104 can also include a communication front end (CFE)/Real Time Data Server (RTDS) to facilitate communications with external entities and users via remote terminal units (RTUs). Note that RTUs can be part of the power utilities' field devices, for example.

The microgrid system 116, as mentioned above, can include distributed renewable generating resources 108' (as well as conventional generating unit types) such as, for example, wind turbine units, solar photovoltaic (PV) systems, energy storage systems (ESS), fuel cell units, micro turbine units, diesel units, and combined heat & power units. In addition, the microgrid system 116 supports various loads 112' coupled to the microgrid transmission line 114' along with the various resources 108'.

Via ICCP 118, for example, a MGMS 120 can communicate with the EMS 104 of the ISO control center 102, and/or in some embodiments, with a utility 110. In some embodiments, the microgrid system 116 can be treated as a combination resource and load coupled to a utility 110.

Analogous to the AGC system 106 of an EMS 104, the MGMS 120 of embodiments of the present invention includes a SGC 122 and a SGD 124. Since a microgrid system 116 requires that generation and load closely balance moment by moment, frequent adjustments to the output of resources 108' can be continuously made by the SGC 122 and SGD 124. In some embodiments for example, the balance can be judged by measuring the system frequency. For example, if system frequency is increasing, more power is being generated than used within the microgrid system 116 and the SGC 122 can direct energy to energy storage systems or output energy to the external macrogrid energy delivery system 100. If the system frequency is decreasing, more load is on the microgrid system 116 than the instantaneous generation can provide, and the SGC 122 can draw more energy from reserves or from the external macrogrid energy delivery system 100.

In power distributed systems and microgrid environments, as distributed generation is located close to demand centers, delivery of required electrical energy results in minimal transmission losses. With increasing penetration of renewable power generation every year, the distribution power utilities have faced the challenges of maintaining reliable operations of the distribution network, ensuring the required quality of electrical power, and providing sufficient active and reactive power reserves to secure the distribution network in case of system disturbances, generation loss, and voltage sag.

In addition, there are cases where semi-autonomous customers (e.g., industrial sites, airports, municipalities, ecocities, multi-facility commercial and residential areas) with their own generation resources 108' can mitigate their energy needs to serve their loads 112'. With increasing installation of distributed generators (wind units, PV units, combined heat & power, gas turbines, etc.) on medium-voltage (e.g., 20 kV) and low-voltage (e.g., 240V) levels, operational challenges for distribution systems are growing rapidly.

It is therefore quite possible that significant amounts of electrical energy produced at low voltage levels flows into the high voltage system. Conceptually, each of these customers can be viewed as a microgrid system 116 connected to the main distribution power macrogrid via a single point of coupling. As a part of the solution to deal with the integration challenges of distributed generators at medium and low voltage levels, those energy customers that have self-supplied generation capability are required to abide by the IEEE 1547 standard for connecting to the main distribution power macrogrid.

To maximize the benefits of owning generation resources, technical decisions are made on a regular basis regarding when to sell or purchase power to/from the main distribution macrogrid. In addition, when there are system disturbances or blackouts on the distribution network, these microgrids should be able to isolate from the main power macrogrid, and take necessary control actions to shed load, ramp up generation, or start up additional gas turbine units to support island operations reliably, smoothly, and economically.

To meet the operational needs emerging from the microgrid systems 116, the MGMS 120, which is a microgrid oriented energy management system, can be integrated to address the specific operational challenges facing these semi-autonomous customers. The software applications and hardware used in the SGC 122 and SGD 124 systems work in conjunction with other Supervisory Control and Data Acquisition (SCADA) applications within the MGMS architecture to provide a comprehensive, autonomous, real-time solution for addressing the needs of evolving microgrid systems 116.

Figure 2:
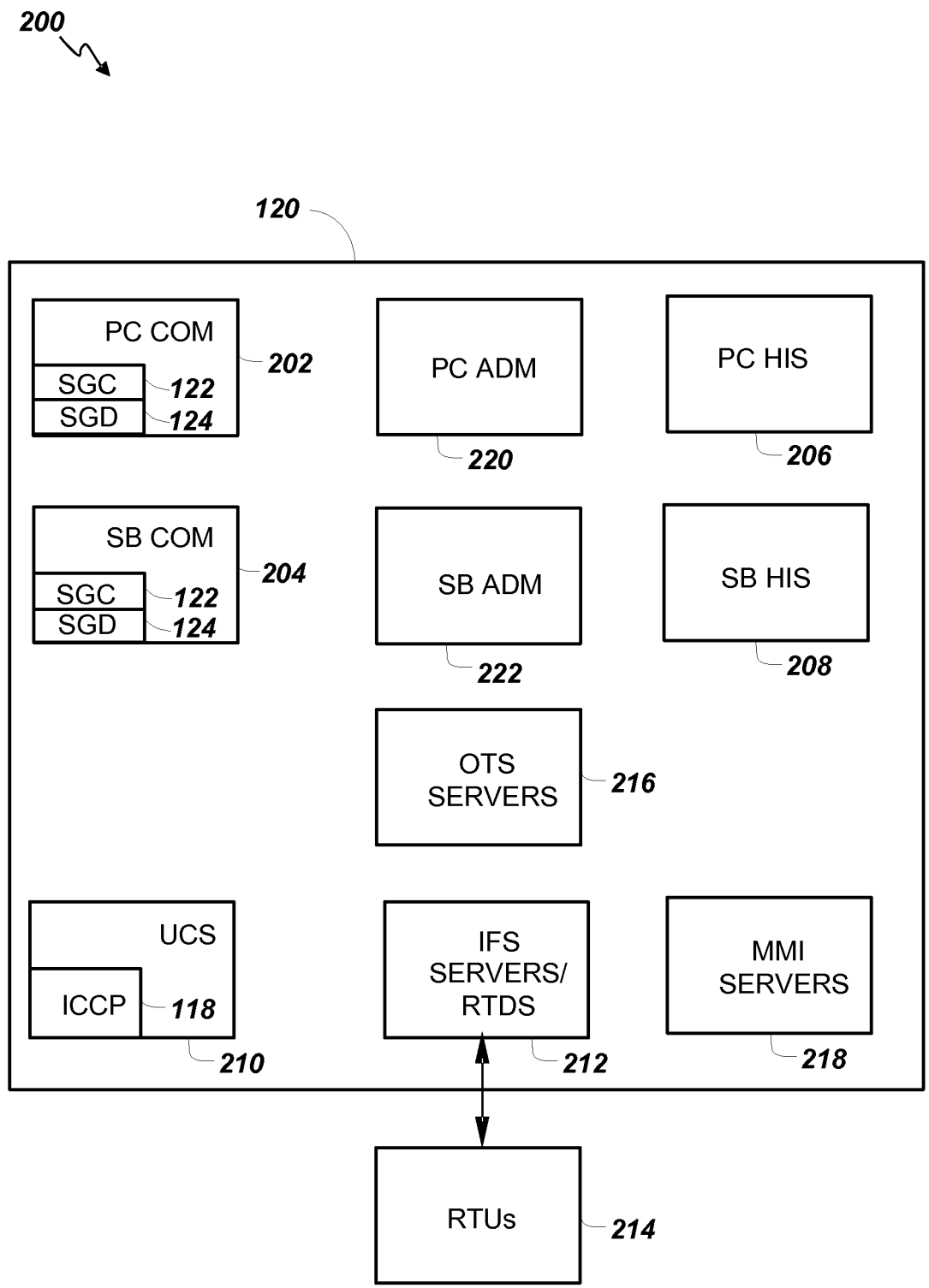
FIG. 2 is a block diagram of details of an example microgrid management system (MGMS) according to embodiments of the present invention.

An example configuration of a MGMS 120 that supports the operation of the SGC 122 and SGD 124 applications is illustrated in FIG. 2. The SGC 122 and SGD 124 applications can be implemented within a Process Controller (PC) server 202 that also includes Communicator (COM) functionality. The MGMS 120 can include redundant back-up servers to provide higher reliability and fault-tolerance. Thus, a Standby (SB) server 204 is also provided in some embodiments. A PC server 206 that implements a Historical Information System (HIS) and a SB HIS server 208 that implements a backup HIS can also be included in the MGMS 120.

In some embodiments, a MGMS 120 further includes one or more utility communication servers (UCS) 210 that each provide an implementation of an Inter-Control Center Communication Protocol (ICCP) 118 that enables communication with, for example, an EMS in operation at, for example, a utility 110 (FIG. 1). In some embodiments, ICCP 118 can be used to implement remote control of resources 108' (FIG. 1) by implementing AGC to SGC system communications between an EMS 104 (FIG. 1) and the MGMS 120. The MGMS 120 can also include an independent front end system (IFS) 212/Real Time Data Server (RTDS) to facilitate communications with external entities and users via remote terminal units (RTUs) 214. In some embodiments, the MGMS 120 can also include a number of additional servers and applications. For example, the MGMS 120 can include Operator Training Simulator (OTS) servers 216, Man-Machine Interface (MMI) servers 218, a PC Administration (ADM) application server 220, and a SB ADM application server 222.

Figure 3:
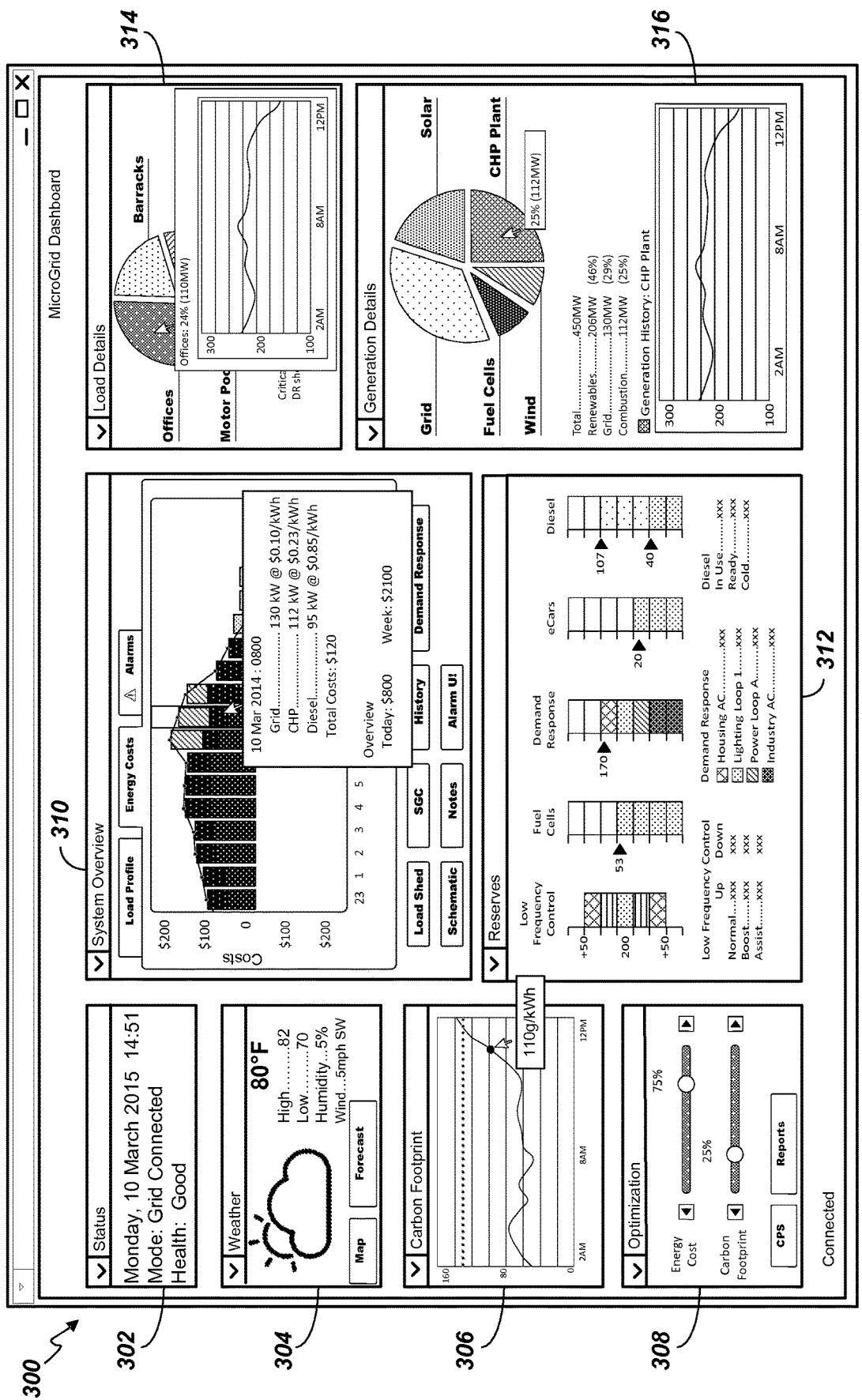
FIG. 3 is a screenshot of an example interface for operating the MGMS according to embodiments of the present invention.

An example user interface layout 300 for monitoring status and controlling operation of the MGMS 120 is depicted in the example display screenshot of FIG. 3. The example user interface layout 300 includes a number of resizable, moveable windows that each display information relevant to the operation and control of the MGMS 120.

A status window 302 can include indicators of current time and date, the current system operating mode (e.g., grid connected, islanded, transitioning to islanded, transitioning to grid connected), and an indication of the overall heath (e.g., a scaled rating indicating the system is functioning properly, experiencing error conditions, warnings, exceptions, etc.) of the MGMS 120. A weather window 304 can include a graphic indicating current weather conditions, an indication of the current outside ambient temperature, an indication of the actual or forecasted high outside ambient temperature for the current day, an indication of the actual or forecasted low temperature for the current day, an indication of the current humidity, and an indication of the current wind speed and direction.

A carbon footprint window 306 can include a dynamic real time running graph displaying an indication of a rate of carbon emissions (e.g., in g/kWh) per unit of energy produced or consumed. A mouse-over function can be provided that allows an operator to cause a numerical value of the instant carbon emissions at a selected time of day to display in a sub-pop-up window by placing a cursor arrow on a point on the graph corresponding to the selected time as shown in FIG. 3.

An optimization window 308 can include slider bars that allow an operator to adjust the relative priority of microgrid system 116 operating constraints such as energy cost and carbon footprint. Additional slider bars for other constraints can also be provided. In addition, buttons for accessing related information such as control performance standards (CPS) data and reports on optimization results.

A system overview window 310 can include tabs for displaying load profile information, energy costs, and alarms. The energy costs display can include a dynamic, real time running graph indicating energy generation costs per hour. A mouse-over function provides a selection option that generates a sub-pop-up window that includes numerical details of information for the selected hour on the graph as shown in FIG. 3. In addition, buttons for accessing related information such as load shed data, SGC data, history data, demand response data, schematic data, notes, and alarm user interface information can be provided.

A reserves window 312 can include various graphs/meters for displaying and/or controlling parameters related to energy reserves. For example, the graphs/meters can include a low frequency control graph, a fuel cells graph, a demand response graph, an eCars graph, and a diesel graph.

A load details window 314 can include a graphical display (e.g., a pie chart) depicting the relative amount of energy various loads within the microgrid are consuming as well as the relative amount being contributed to the external macrogrid. A mouse-over function can be provided that generates a sub-pop-up window that includes numerical and graphical details regarding the absolute energy consumption over time of the selected load.

A generation details window 316 can include a graphical display (e.g., a pie chart) depicting the relative amount of energy various resources within the microgrid are contributing as well as the relative contribution of the external macrogrid. A mouse-over function can be provided that generates a sub-pop-up window that includes numerical and graphical (e.g., a plot of energy generated over time) details regarding the absolute energy contribution over time of the selected resource.

Numerous additional or alternative windows can be provided to allow monitoring and control of the various parameters of the MGMS 120. The example windows depicted in FIG. 3 and the sample data displayed therein are merely illustrative of some the types information and controls that can provided.

The SGC application features a number of salient enhancements supported by several functional modules that are described in more detail below. These modules work together in a coordinated manner to support a number of system functions including, for example, renewable generation control, fast resource start up, microgrid system mode, microgrid ace control mode, supervisory control, interchange control, automatic voltage control, islanded frequency control, resynchronization, pv unit control, fuel cell control, ess control, economics and ecology control, rejecting/following schedules, and reserve monitor.

The Renewable Generation Control function supports renewable generating resources and energy storage systems such as Wind, PV Solar, Fuel Cells, battery energy storage system (BESS), Flywheel, etc.

The Fast Resource Start Up function supports fast start up resources such as diesel generators that can start up almost immediately.

The Microgrid System Mode function enables the microgrid to operate in grid connected mode and island mode as well as to conduct seamless a transition from grid connected mode to island mode and to restore the connection back to the distribution power macrogrid whenever feasible.

The Microgrid ACE Control Mode function supports Constant Interchange control when in grid connected mode and Constant Frequency control when operating in island mode.

The Supervisory Control function enables monitoring microgrid operation without taking corrective control actions from SGC while following optimized schedules for the purpose of observing economics, emission reduction or providing reserve capacity as needed.

The Interchange Control function operating in grid connected mode, controls the output of on-line generating units so as to maintain the actual interchange between the microgrid and the external distribution power macrogrid to a desired interchange schedule.

The Automatic Voltage Control function enables monitoring voltage at the microgrid's main interconnect bus to regulate it to within a desired voltage range.

The Islanded Frequency Control mode function enables monitoring island frequency in the island mode of operation and to take corrective action to restore sufficient responsive reserve for enabling load following resources take responsive action for regulating microgrid frequency to within a desired frequency range.

Upon a forced islanding situation due to a sustained low or high voltage condition at the interconnect bus, the resynchronization function enables monitoring voltage recovery on the grid side bus to automatically attempt a grid synchronization.

The PV Unit Control function enables monitoring and control of PV resources to achieve desired operational performance by automatically assigning an appropriate operating mode based on whether the microgrid is islanded or connected to the distribution power grid. These operating modes include Voltage/VAR regulation, voltage droop control, low/high voltage ride through, frequency ride through, and frequency droop control as deemed relevant.

The Fuel Cell Control function enables monitoring and control the fuel cells to support the microgrid's operation in grid connected mode, island mode, and during transitions.

The ESS Control function enables monitoring and control of Energy Storage Systems (ESS) to support the microgrid's operation in grid connected mode, island mode, and during transitions. The ESS units may operate in one of the following operating modes: demand charge management, ancillary service mode, and standby mode.

The Economics and Ecology Control function provides the optimal operating points for resources taking into account operating conditions such as projected load and renewable forecasts, operating limits, ramp constraints, as well as heat rate and emissions.

The Rejecting/Following Schedules function automatically decides whether optimized schedules are to be followed or ignored temporarily based operating conditions.

The Reserve Monitor function enables monitoring of the microgrid's actual reserves against the minimum requirements for responsive, regulating as well as reactive reserves and alarming deficiencies. This function initiates corrective action for establishing sufficient responsive reserve for enabling load following resources to take responsive action for regulating microgrid frequency to within desired limits in island mode operation.

In order to ensure consistent operation without interruption of the microgrid under various operating conditions, the algorithmic procedures or functions listed above work together in a coordinated manner within the MGMS 120. Operating details of these major functions of the SGC application are now described.

As mentioned above, the Microgrid ACE Control Mode function supports Constant Interchange control when in grid connected mode and Constant Frequency control when operating in island mode. A microgrid can be set to operate by following "area control error" (ACE) control modes depending upon the system's mode of operation. The Constant Interchange mode is only allowed in the macrogrid connected mode. The Constant Frequency mode is only allowed in the island mode. The Supervisory mode is possible independent of which system mode the microgrid is operating. In the Supervisory mode, Area Control Error is not calculated. Instead, microgrid resources follow set points from an optimization module or manually provided set points. The above may be more clearly expressed in the following table:

| System Mode | Possible ACE Control Modes |
|---|---|
| Grid Connected | Constant Interchange/Supervisory |
| Island | Constant Frequency/Supervisory |

Transition from a grid connected mode to island or vice-versa may be initiated by an operator request or by an automatic process. When such a transition occurs, the ACE control mode is automatically set based upon the system mode. The following table indicates how the ACE control mode is set for a given transition based on the current Ace control mode:

| System Mode Transition | Current ACE Control Mode | ACE Control Mode Changed To |
|---|---|---|
| Grid Connected => Island | Constant Interchange | Constant Frequency |
| Grid Connected => Island | Supervisory | Supervisory |
| Island => Grid Connected | Constant Frequency | Constant Interchange |
| Island => Grid Connected | Supervisory | Supervisory |

As mentioned above, the Supervisory Control function enables monitoring microgrid operation without taking corrective control actions from SGC while following optimized schedules for the purpose of observing economics, emission reduction or providing reserve capacity as needed. Thus, the operator may choose to operate the microgrid in this ACE control mode. In addition, the microgrid is automatically placed in Supervisory mode whenever transitioning from a grid connected to an islanded mode, and there is at least a load following resource that is online. In this mode of operation, Wind and PV resources are controlled locally (MPPT). ESS resources not following optimized schedules are selected to operate in base mode while load following resources are forced to be in local (governor-droop) control. Microgrid resources follow set point from optimization module or manually provided set point.

As mentioned above, the Interchange Control function operating in grid connected mode, controls the output of on-line generating units so as to maintain the actual interchange between the microgrid and the external distribution power macrogrid to a desired interchange schedule. This ACE control mode is possible only when the microgrid is connected to the distribution power grid. This mode of operation enables the regulation of interchange with the external distribution grid to a desired target level, as ACE is derived based solely on the interchange deviation between the actual and a schedule.

As mentioned above, the Frequency Control mode function enables monitoring island frequency in the island mode of operation and to take corrective action to restore sufficient responsive reserve for enabling load following resources take responsive action for regulating microgrid frequency to within a desired frequency range. This ACE control mode is possible only when the microgrid is islanded. This mode of operation enables the regulation of microgrid frequency to within tolerable limits, as ACE is derived based solely on the deviation of frequency from the nominal frequency.

As mentioned above, the Renewable Generation Control function supports renewable generating resources and energy storage systems such as Wind, PV Solar, Fuel Cells, battery energy storage system (BESS), Flywheel, etc. Depending on the microgrid's operating mode, ACE control mode and Automatic Voltage Control mode, renewable resources are automatically placed in a desired operating mode to make best possible contributions for each case.

In grid connected mode operation with Constant Interchange ACE Control Mode, for enabling regulation of interchange with the external distribution grid to a desired target level, this mode derives ACE based solely on the interchange deviation between the actual and a schedule. The processed ACE signal from a PI controller is utilized to determine the required regulation amount that is to be distributed amongst the regulating units. The output of the PI controller is expressed as:

$$PI_{out} = k_1 ACE + k_2 \frac{\int_t ACE d_t}{T_1}$$

where $k_1$ and $k_2$ are positive, tunable gains; and $T_1$ is a tunable integration time constant. As a rule of thumb, PV and wind resources are typically assigned to follow schedules whereas ESS (e.g., battery) resources invariably participate in ACE regulation depending on their ramp and operational limit constraints.

In the corresponding Supervisory Mode of operation, Wind and PV resources are controlled locally (MPPT). ESS resources not following optimized schedules are selected to operate in base mode while load following resources are forced to be in local (governor-droop) control.

In Island mode operation with Constant Frequency ACE Control Mode, for enabling regulation of microgrid frequency to within tolerable limits, this mode derives ACE based solely on the frequency deviation. The processed ACE signal from a PI controller is utilized to determine the required regulation amount that is to be distributed amongst the regulating units. As a rule of thumb, PV and Wind resources are typically assigned to follow schedules whereas ESS (i.e. Battery) resources invariably participate in ACE regulation depending on their ramp and operational limit constraints.

In the corresponding Supervisory Mode of operation, Wind and PV resources are controlled locally (MPPT). ESS resources not following optimized schedules are selected to operate in base mode while load following resources are forced to be in local (governor-droop) control.

Islanding the microgrid due to external disturbances is an additional function the SCG can initiate. A microgrid normally operates in the grid connected mode. However, situations may arise where the interconnect bus voltage may witness sustained low or high voltage violations due to external disturbances in the distribution macrogrid. Using the Automatic Voltage Control feature, the SGC can be utilized to automatically ramp the microgrid resources up or down, including starting up or shutting down such resources, to enable grid healing as a corrective measure. Should such measures prove inadequate; the SGC can automatically force the microgrid to disconnect from the grid and island to isolate the microgrid from the external disturbance.

As mentioned above, the Automatic Voltage Control (AVC) function enables monitoring voltage at the microgrid's main interconnect bus to regulate it to within a desired voltage range. The terminal voltage of generating resources is maintained within pre-designated limits to prevent damage and premature equipment wear and tear. In grid connected mode operations, during persistent low or high voltage violations at the interconnect bus, the SGC determines if such voltage violations can be alleviated by raising or lowering the active power outputs of resources including starting or shutting down of resources if necessary. In island mode operations, the AVC function computes the appropriate reactive power deemed sufficient to support the interconnect bus voltage to a desired level. The calculation is based on the Voltage-VAR droop setting of each participating generating resource. The desired VAR set point calculated for each participating resource is ensured to maintain the terminal bus voltage of the resource to within its own voltage limits. The logic for allocation of reactive power to each participating resource automatically removes such a resource from participating further once its terminal bus voltage reaches a limit.

In grid connected mode operation, the AVC function can attempt to rectify such voltage violations by controlling the active power output of online resources using one of a few different methodologies. A Voltage Violation Detection method can be used. This method monitors for voltage violations at the interconnect bus against nominal voltage and issues an alarm if the violation persists. The default pre-specified minimum voltage is the minimum specified in ANSI C84.1 "A" range. When the actual voltage at the interconnect bus violates either the low or high voltage limit, a timer is started to track the voltage violation time. If the duration of the voltage violation exceeds a pre-designated time period, a persistent voltage violation is claimed. An alarm is issued to indicate the persistent voltage violation and differentiate it from temporary violations.

In case of a persistent voltage violation, the microgrid's VAR control is automatically turned on. Each resource's startup and shutdown priorities are automatically retrieved from pre-configured priority checklists provided for by the microgrid.

If there is a persistent low voltage violation with the microgrid importing power, the following steps are taken. All online PV Solar and Wind resources are automatically forced to operate locally in MPPT mode. All other online resources are forced to operate in Frequency Droop control if not so already. For each priority level, the number of available resources is determined, along with the room-to-move in the upward direction.

If there is a persistent high voltage with the microgrid exporting power, the following steps are taken. All online PV Solar and Wind resources are automatically forced to operate in MPPT mode; if these units are on SGC, they will be taken off SGC, and they will be controlled locally. All other online resources are forced to operate in Frequency Droop control if not so already. For each priority level, the number of available resources is determined, along with the room-to-move in the downward direction.

In some embodiments, priority based resource control for voltage correction can be used. Where there is a persistent low voltage violation with the microgrid importing power, the following steps are taken. The amount of microgrid generation that needs to be moved up without reversing the direction of the tie flow to the external distribution grid is determined. This represents the microgrid's generation room-to-move in the upward direction. The microgrid desired room-to-move upward is proportionally allocated as an active power increment to respective sustained generation among all eligible resources based on each resource's room-to-move capacity in the upward direction. PV solar, wind, and other online resources not in Frequency Droop control are skipped. The microgrid's room-to-move allocation begins with the highest priority. If the required room-to-move amount can be entirely allocated amongst a higher priority level, the remaining amount is to be allocated to the next priority level. The process continues until there is no remaining allocation amount. If there is still a remaining allocation amount after all eligible resources have been utilized for all priorities, then this indicates there is a need to start up off-line resources. Resources are started one by one to allow time for the voltage recovery ensuring an absolute need for additional resources for further improvement in microgrid voltage. The process to determine which resource is to be started begins with a preconfigured list of resources that have the highest priority, using the largest resource for that priority. The process continues with the next largest resource for the same priority before moving to the next lower priority based resources until all priorities have been exhausted. In case of continued low voltage violation even after all resources have eventually started, the AVC automatically forces the microgrid to island.

Where there is a persistent low voltage violation with the microgrid exporting power, the microgrid is forced to island because a low voltage situation cannot be improved by increasing microgrid generation since the microgrid is already exporting power.

Where there is a persistent high voltage violation with the microgrid exporting power, the following steps are taken. The amount of generation that needs to be moved down without reversing the direction of the tie flow to the external distribution grid is determined. This represents the microgrid's generation room-to-move in the downward direction. The microgrid's desired room-to-move downward is proportionally allocated as an active power increment to respective sustained generation among all eligible resources based on each resource's room-to-move capacity in the downward direction. PV solar, wind, and other online resources not in Frequency Droop control are skipped. The microgrid's room-to-move allocation begins with the highest priority. If the required room-to-move amount cannot be entirely allocated amongst a higher priority level, the remaining amount is to be allocated to the next priority level. The process continues until there is no remaining allocation amount. If there is still a remaining allocation amount after all eligible resources have been utilized for all priorities, then this indicates there is a need to shut down online resources based on priority. Resources are shut down one by one to allow time for the voltage recovery ensuring an absolute need for additional resources to follow for further improvement in microgrid voltage. The process to determine which resource is to be shut down begins with a preconfigured list of resources that have the highest priority, using the resource with the largest low operating limit for that priority. The process continues with the resource with the next largest low operating limit for the same priority before moving to the next lower priority based resources till all priorities have been exhausted. In case of continued high voltage violation even after all resources have been shut down, the AVC automatically forces the microgrid to island.

Where there is a persistent high voltage violation with microgrid importing power the microgrid is set to island because high voltage situation cannot be improved by decreasing microgrid generation since the microgrid is already importing power.

In island mode operation, AVC tries to rectify such voltage violations by controlling the reactive power output of online resources using a different set of methods. Participating resource's desired KVAR setpoint is set equal to a user-specified rule of thumb value for resources selected for constant KVAR control. Alternatively, participating resource's desired KVAR setpoint is set equal to the KVAR requirement from resource selected for V-Q Droop control. The desired KVAR requirement for correcting the interconnect bus voltage error is allocated among the participating resources in accordance to their V-Q Droop characteristics.

Figure 4:
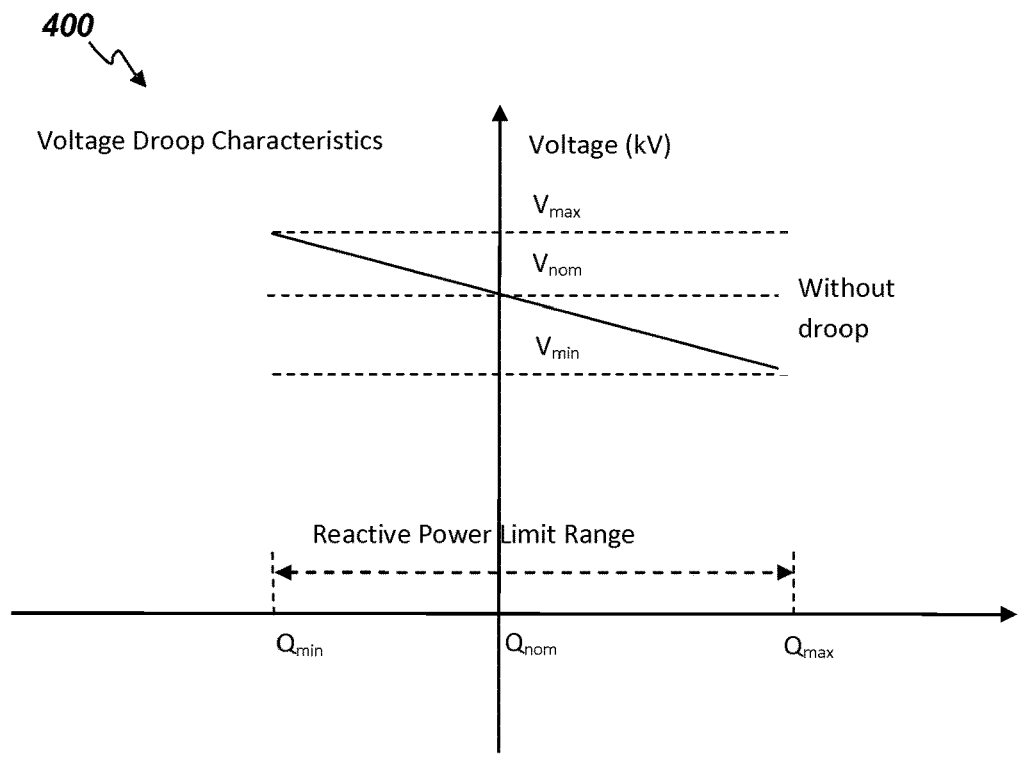
FIG. 4 is a graph depicting voltage droop characteristics according to embodiments of the present invention.

In an analogy to a conventional generating unit's frequency droop characteristics, the microgrid resources' voltage droop characteristics are used to regulate the unit's terminal voltage level within a desired voltage range. An example of a resource's voltage droop characteristics curve 400 is illustrated in FIG. 4. The voltage droop, like a generating unit's frequency droop, is typically expressed as percentage. By employing the resource's voltage droop characteristics curve 400, the required reactive power can be determined to achieve the desired unit terminal voltage. For example, let the droop be expressed as:

$$\text{Droop} = \frac{Q_{max} - Q_{nom}}{V_{max} - V_{min}} \times 100\%$$

Let the desired voltage be denoted by $V_{des}$. The required reactive power can be determined by the following equation:

$$Q_{des} = Q_{nom} + (V_{des} - V_{nom}) * \text{Droop}$$

Note that once the reactive power set point is enforced, the resource's active power generation is constrained based on the unit's operating characteristics (e.g., the KVAR capability curve). As shown in the generating unit's capability curve 500 of FIG. 5, when the voltage control is active, the resource's MW control takes into account the voltage control constraint applied on the resource's operating MW limit.

Figure 5:
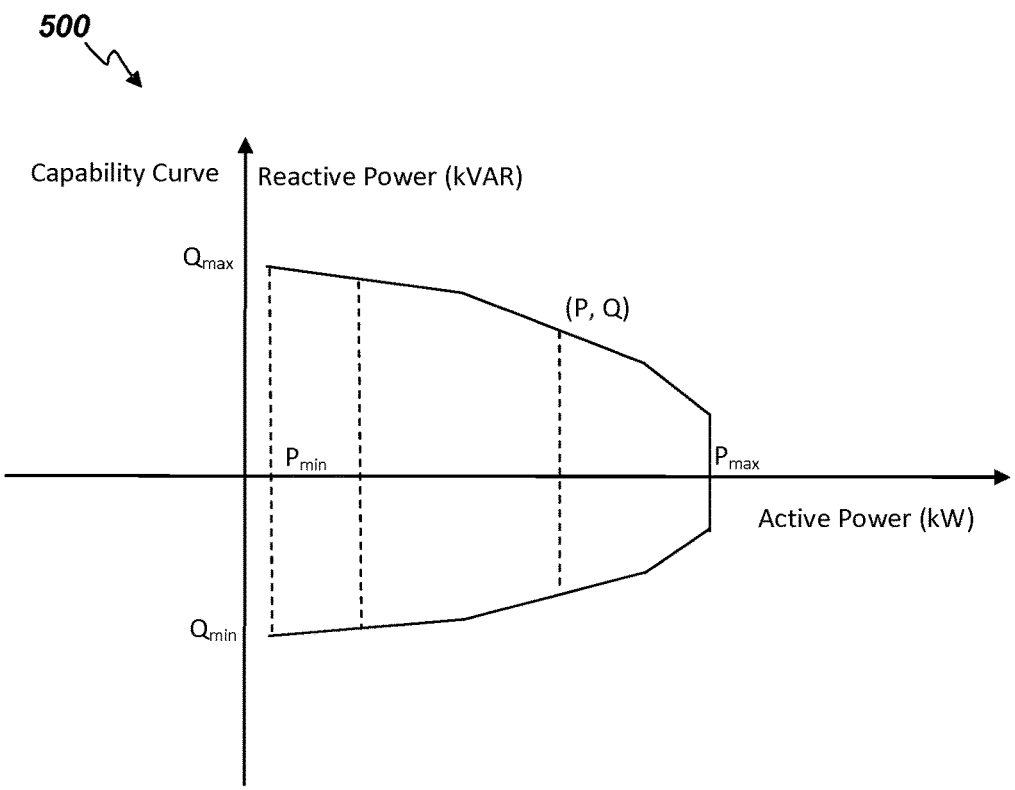
FIG. 5 is a graph depicting a capability curve according to embodiments of the present invention.

Corresponding to each resource's current power operating point (e.g., (P,Q) in FIG. 5), the reactive power capability can be determined from capability curve limits. The amount of KVAR capability that can be assigned to each participating resource can therefore be determined based on its operating point Q and the KVAR limits corresponding to its active power operating point P. The KVAR requirement for each participating resource is next determined from the total KVAR requirement for correcting the interconnect bus voltage to within its desired limits based on an allocation algorithm. The desired KVAR requirement that is to be assigned to each participating resource is further checked to ensure that its own terminal bus voltage stays within limits. If this is not guaranteed, its KVAR share is limited to a value that can sustain its terminal bus voltage at the violated limit and such a resource is then taken out of further participation. This allocation is continued until such time when either the entire KVAR requirement gets appropriately apportioned or there are no other participating resources available to consume the remaining unallocated KVAR requirement. In the latter case, an attempt is made to bring additional resource under AVC control if possible.

As mentioned above, the Islanded Frequency Control mode function enables monitoring island frequency in the island mode of operation and to take corrective action to restore sufficient responsive reserve for enabling load following resources take responsive action for regulating microgrid frequency to within a desired frequency range. The primary frequency control determines how the load sharing is coordinated during load changes (e.g., for a few seconds). A secondary controller is expected to distribute the load among the distributed generating resources while attempting to maintain the microgrid's frequency at its nominal value. This task can be performed in two possible ways: (1) by using generating resources designated to provide the Load Following service (utilizing their governor droop characteristics); or (2) by the direction of the SGC.

When one or more generating resources designated as Load Following resources are detected as being online, the SGC automatically switches the microgrid to operate in Supervisory mode, wherein no ACE is processed. In such a scenario, PV Solar and Wind resources are forced to operate locally in MPPT mode while all other online resources are set to follow their individual schedules. In Constant Frequency ACE control mode, the SGC derives total desired generation and distributes it among the participating generating resources. In this scenario, the SGC monitors the responsive reserve of load following resources to force a readjustment of online generation should such reserves deplete while regulating the island frequency.

As mentioned above, upon a forced islanding situation due to a sustained low or high voltage condition at the interconnect bus, the resynchronization function enables monitoring voltage recovery on the grid side bus to automatically attempt a grid synchronization. Due to sustained voltage violation at the point of common coupling (PCC) with the distribution power grid, the microgrid may be forced to operate in the island mode by operator action or may be instructed by the SGC to transition to islanding (e.g., in response to the SGC sending control signals to disconnect from the distribution power grid). A microgrid may be forced to island from the grid during persistent voltage violations at the interconnect bus. The following are the two conditions when automatic islanding can occur: (1) the microgrid voltage control is enabled during grid mode operation and a sustained low voltage condition is prevalent at the interconnection bus with microgrid exporting power to the distribution power grid; and (2) the microgrid voltage control is enabled during grid mode operation and a sustained high voltage condition is prevalent at the interconnection bus with microgrid importing power from the distribution power grid.

Following a forced islanding, the SGC continues to monitor the voltage at the interconnection bus to determine if the voltage situation has improved. If the voltage has recovered back within its specified limit range, a timer is started to ensure that the interconnect bus voltage stays within the specified range of its nominal voltage to claim a voltage recovery.

In island mode operation, the microgrid frequency is automatically regulated by the primary load following resources with the aid of other resources under SGC control as secondary control resources. Upon detection of voltage recovery, the SGC checks to determine if re-synchronization to the distribution power grid is set to Manual or Automatic.

In "Manual" mode, a notification alarm is issued to indicate conditions are favorable for manual resynchronization. In "Automatic" mode, the SGC attempts to re-connect to the grid via a command to the auto-synchronization relay. A resynchronization timer is also started to keep track of time since a command for resynchronization has been issued.

The Auto-synchronization process includes automatic shutting down of any on-line load-following resource in addition to the checking of the microgrid's voltage and phase angle with respect to the interconnection prior to closing the tie-breaker. At each subsequent cycle, the SGC checks to ensure the microgrid's connectivity status has changed to indicate grid operational mode in order to augment a resynchronization timer. If this timer violates (e.g., exceeds) the allowed resynchronization time period, an alarm is issued to notify resynchronization failure marking the completion of the resynchronization attempt.

As mentioned above, the PV Unit Control function enables monitoring and control of PV resources to achieve desired operational performance by automatically assigning an appropriate operating mode based on whether the microgrid is islanded or connected to the distribution power grid. Solar PV resources can operate in several different modes to provide desired active power, active power reserve, reactive power and reactive power reserve. PV resources can be set in MPPT operational mode for maximum power output. These resources can however be assigned different operating modes depending on whether the microgrid is operating in grid connected or island mode.

When the microgrid system is in grid connected mode, the PV operating mode is prohibited from being in Voltage Regulation mode. The PV inverter operates in constant power factor mode. Any PV resource placed in Voltage Regulation mode will be taken out of that mode.

When the microgrid system is in grid connected mode and the PV operating mode is MPPT, the resource is taken off the SGC and will be controlled locally for maximum active power output.

When the microgrid system is in island mode and the PV operating mode has Volt/VAR regulation disabled, the resource is taken off the SGC and will be controlled locally for voltage or reactive power control.

When the microgrid system is in island mode and the PV operating mode is reactive power control, PV resources can be assigned constant power factor, voltage droop, or KVAR control mode. In constant power factor mode, voltage set-point control is done locally or in a supervisory manner, but not via the SGC. In voltage droop control mode, the SGC can properly assign reactive power contribution to control the voltage. In KVAR control mode, the KVAR set point control is implemented in a supervisory manner, not via the SGC.

When the microgrid system is in grid connected mode or island mode and the PV operating mode is voltage ride-through, the microgrid can enable or disable this option. The voltage ride-through capability prevents the resource from tripping during disturbances resulting in temporary high or low voltage condition. Further, the voltage ride-through capability helps in preventing unwanted trips during phases such as restoring from blackout, islanding from grid, or reconnecting to grid.

When the microgrid system is in grid connected mode or island mode and the PV operating mode is frequency ride-through, the microgrid can enable or disable this option. The frequency ride-through capability prevents the resource from tripping during disturbances resulting in a temporary high or low frequency condition. The frequency ride-through capability helps in preventing unwanted trips during phases such as restoring from blackout, islanding from grid, or reconnecting to grid.

As mentioned above, the Fuel Cell Control function enables monitoring and control the fuel cells to support the microgrid's operation in grid connected mode, island mode, and during transitions. Fuel Cell resources can be set to operate in several different modes to provide desired active power, active power reserve, reactive power and reactive power reserve. Fuel Cell resources are capable of providing load following services as well, similar to diesel generators. Fuel cells can also be assigned different operating modes depending on whether the microgrid is operating in grid connected or island mode.

When the microgrid system is in grid connected mode, the fuel cell resource operating mode is prohibited from operating in Voltage Regulation mode. The inverter operates in constant power factor mode. Any Fuel Cell resource placed in Voltage Regulation mode will be taken out of that mode.

When the microgrid system is in grid connected mode and the fuel cell resource operating mode is in frequency-droop control mode, the resource can be placed under SGC control for active power control or can be locally controlled. Fuel Cells can also provide load following service.

When the microgrid system is in island mode, Volt/VAR regulation is disabled. The resource is taken off SGC control and will be controlled locally for voltage or reactive power control.

When the microgrid system is in island mode and the fuel cell operating mode is reactive power control, the fuel cells can be assigned constant power factor, voltage droop, or KVAR control mode. In constant power factor mode, voltage set point control is done locally or in a supervisory manner, but not via the SGC. In voltage droop control mode, the SGC can properly assign reactive power contribution to control the voltage. In KVAR control mode, the KVAR set point control is implemented in a supervisory manner, not via the SGC.

When the microgrid system is in grid connected or island mode and the fuel cell operating mode is voltage ride-through, the operator can enable or disable this option. The voltage ride-through capability prevents the resource from tripping during disturbances resulting in temporary high or low voltage condition. Further, the voltage ride-through capability helps in preventing unwanted trips during phases such as restoring from blackout, islanding from grid, or reconnecting to grid.

When the microgrid system is in grid connected or island mode and the fuel cell operating mode is frequency ride-through, the operator can enable or disable this option. The frequency ride-through capability prevents the resource from tripping during disturbances resulting in temporary high or low frequency condition. Further, the frequency ride-through capability helps in preventing unwanted trips during phases such as restoring from blackout, islanding from grid, or reconnecting to grid.

As mentioned above, the ESS Control function enables monitoring and control of Energy Storage Systems (ESS) to support the microgrid's operation in grid connected mode, island mode, and during transitions. ESS resources such as batteries, flywheels, and super capacitors offer high response rate. Battery storage systems can be used for demand charge management, which includes charging during off peak demand hours and storing the energy captured from PV and wind resources and utilizing the available power during peak demand hours. When Demand Charge Management is active, the battery resources follow the demand charge management schedules which take into account the battery's state of charge (SOC).

In grid connected mode, the battery resources may be operated locally ready for possible transition to island mode operation. When such a transition gets initiated, the battery resources are activated to supply required power in a local, autonomous controller mode.

In island mode, the battery resources can be utilized to provide regulation, regulating reserve, and reactive power support. In such operation should a persistent low or high voltage violation prevail, Automatic Voltage Control will take precedence over Demand Charge Management. In other words, the battery resources will be primarily controlled for correcting voltage violation and maybe deviate from following demand charge management schedules.

In grid connected mode, in the absence of persistent low or high voltage violation, if Demand Charge Management is not active, battery resources can be assigned to operate in Economic, Base Loaded, Ramp, Schedule, Market mode including regulation. The regulating limits of a battery resource are dependent upon its SOC and are calculated from the SOC measurement and its charge/discharge rate characteristics.

As mentioned above, the Economics and Ecology Control function provides the optimal operating points for resources taking into account operating conditions such as projected load and renewable forecasts, operating limits, ramp constraints, as well as heat rate and emissions. While PV resources typically operate in MPPT mode, they can also be assigned to operate in Economic mode. The optimal operating point for each participating economic resource is obtained from the SGD's optimization process which attempts to minimize the microgrid's overall production cost while respecting constraints such as power balancing, reserve requirements, regulating limits, and emission constraints.

In power balancing, the total generation to be dispatched among participating economic resources along with non-participating resources is required to match the microgrid demand and interchange constraint. Reserve requirements is a constraint wherein the sum total of reserve contributions from all SGC resources are required to be greater or equal than the minimum regulating reserve and minimum spinning reserve requirement. Regulating limits is a constraint wherein the resource's reserve contribution and optimal generation, determined together, is required not to exceed the resource's regulating limits.

The Smart Generation Dispatch (SGD) application works in conjunction with the SGC to provide resource schedules in a timely manner. These schedules, in addition to observing economics, may require a reduction in emissions of diesel or other resources. In such cases, the emission constraints are enforced to minimize the emission at the desired operating point. This is achieved by associating a penalty (e.g., assigning an emission cost) on resources that have a high emission rate compared to other resources.

There may be times when a microgrid's upward and/or downward regulating reserves are insufficient to meet the respective minimum regulating reserve requirements. While appropriate alarms are issued to indicate any reserve shortfall, there may be a need to start up additional off-line resources or shut down on-line resources. This is can be done via a Unit Commitment application implemented within the SGD. The start-up or shut-down schedules generated as a result of the optimization process are made available to the SGC so that timely commands can be sent to the individual resources for following such schedules.

As mentioned above, the Reserve Monitor function enables monitoring of the microgrid's actual reserves against the minimum requirements for responsive, regulating as well as reactive reserves and alarming deficiencies. To ensure sufficient frequency regulation capability in island mode operations, adequate regulating reserve and spinning reserve must be available. Load following resources are typically responsible for frequency regulation and serve as primary controllers in such a scenario. They track the microgrid load and absorb load change to maintain frequency stability via their governor droop characteristics. Other regulating resources, if any, under SGC control contribute towards regulating reserve for picking up incremental generation changes up to their individual regulating high or low limits, so as to relieve the load following resources to some extent. Active and reactive reserves provide for voltage regulation capability when resources are committed for VAR support. Reserve requirements are specified by the operator as schedules, or as a percentage of the largest on-line unit. All categories of active and reactive reserves are monitored against their respective reserve requirements and alarmed for any deficiencies.

When there are load following resources online, the responsive reserve is provided only by such resources. The responsive reserved is calculated as follows. The Responsive Reserve Up (KW) is calculated as the difference between the resource's Maximum Operating Limit (KW) and its current output (KW) that can be further restricted by the resource's ramp capability over a configurable responsive reserve ramp time. The Responsive Reserve Down (KW) is calculated as the difference between the resource's Current Output (KW) and its Minimum Operating Limit (KW) that can be further restricted by the resource's ramp capability over a configurable responsive reserve ramp time. The System Responsive Reserve Up is calculated as the sum of the Responsive Reserve Up contributions by all eligible load following resources. The System Responsive Reserve Down is calculated as the sum of the Responsive Reserve Down contributions by all eligible load following resources.

Regulating reserve is calculated for all online resources under SGC control that are not load following or PV Solar or Wind. The Regulating Reserve Up is calculated as the difference between the resource's Maximum Operating Limit (KW) and its current output (KW) which is further restricted by the resource's ramp capability over the configurable ramp time. The Regulating Reserve Down is calculated as the difference between the resource's Current Output (KW) and its Minimum Operating Limit (KW) which is further restricted by the resource's ramp capability over the configurable ramp time. The System Regulating Reserve Up is calculated as the sum of the Regulating Reserve Up contributions by all eligible resources. The System Regulating Reserve Down is calculated as the sum of the Regulating Reserve Down contributions by all eligible resources.

The Reactive Reserve is reactive capacity available currently based on the resource's capability curve, the actual reactive power and the maximum reactive power limit. This indicates how much reactive power can be supplied with current active power production. Reactive reserve is calculated from KVA rating, max KVAR, and max KW parameters of the generating resources.

Figure 6:
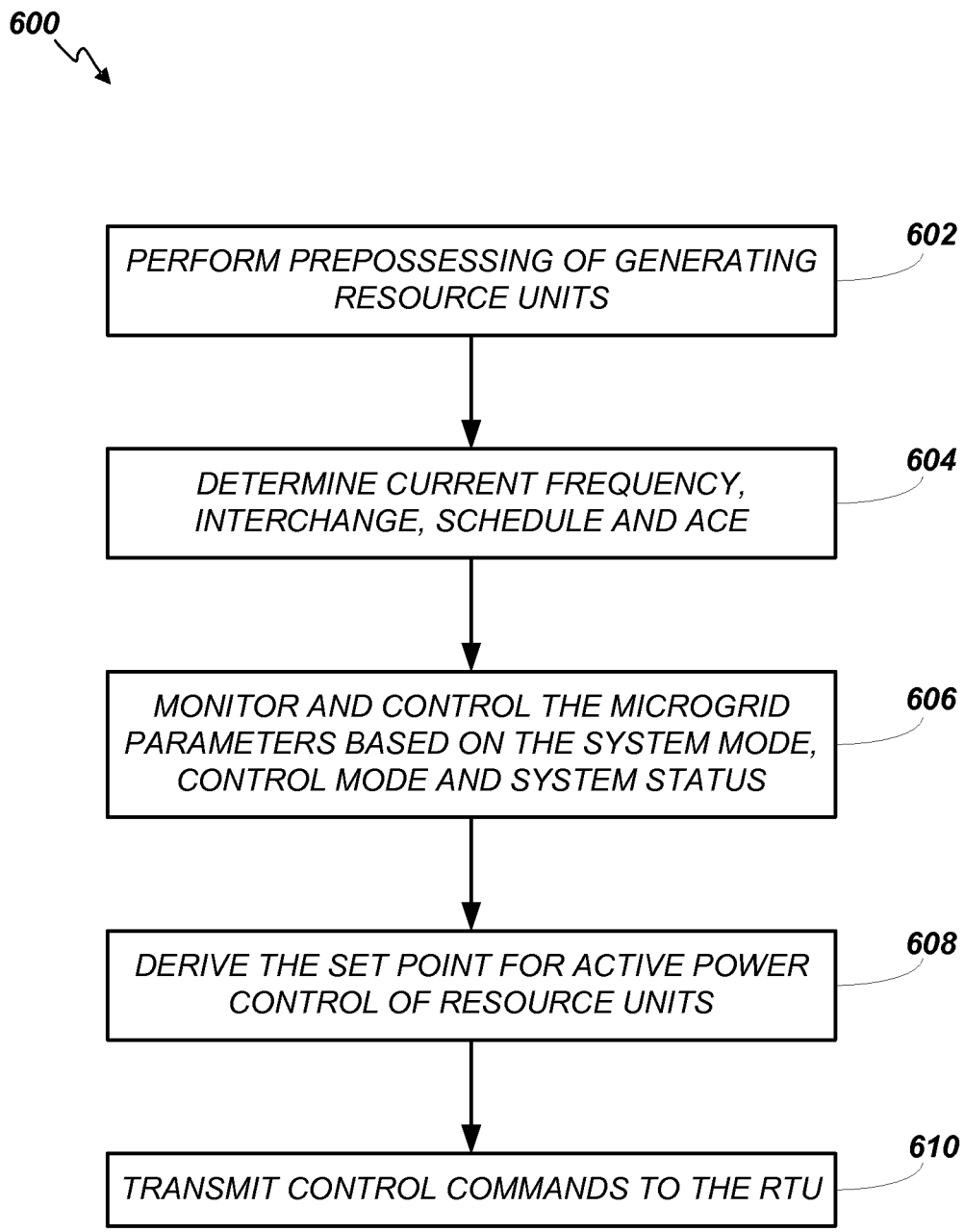
FIG. 6 is a flowchart depicting an first example method according to embodiments of the present invention.

Turning now to FIG. 6, an example method 600 for improved generation control of microgrid energy systems is depicted in a flow chart. The method is executed cyclically. Initially, preprocessing of the generating resource units' data is performed (602). This includes fetching and filtering the current unit and interchange power from an operating database as well as calculating the current sustained generation of each generating unit. The current frequency, interchange, schedule and ACE are then determined (604). This includes fetching and filtering the current frequency from the operating database, calculating the current interchange and schedule, and calculating the ACE.

The determined parameters are then used to monitor and control the microgrid operating parameters based on the system mode, control mode and system status (606). This can include any practicable combination of checking the microgrid system mode, loading the following resource units processing and ACE mode updates, monitoring the microgrid voltage and exercising AVC, monitoring the microgrid reserves, performing microgrid island frequency control, performing microgrid resynchronization to the external macrogrid following island voltage recovery, executing smart generation dispatch, performing microgrid voltage/VAR control and kW control, performing microgrid supervisory control, and updating the results of these functions on both the microgrid and resource unit levels to the real time operating database.

The set point for active power control of the resource units is then derived (608). This includes determining the set point with validation and updating the results into the real time operating database. Finally, the control commands are transmitted to the RTU (610). This includes sending digital control commands such as unit start-up/shut-down, remote/local, islanding/reconnecting, and LVRT/FRT enable/disable; sending integer control commands such as kW Control Mode; and sending kW, kVAR, and kV control commands.

The SGC of the MGMS utilizes a real-time operational database for fast data input/output operations. The SGC uses static input data including the resources' nominal limits; sustained response rate limits; incremental heat rate (IHR) curves for thermal units; charge/discharge curves for battery resources; equivalent incremental cost curves for PV solar and wind; unit incremental maintenance cost for thermal units; wind turbine power output curves; PV solar power characteristics; and the like.

Dynamic input data includes the real-time measurements, schedules, calculated values and user input data. The data retrieved from the MGMS database includes microgrid ACE; microgrid's current actual load; microgrid's current actual net interchange; microgrid's reserve requirements; microgrid's current actual voltage at the main coupling point; resource kW (kilo-watt) output; resource connection status; resource operating limits; resource operating mode; resource ramp rates; IHR curve selection; Battery Resource state of charge (SOC); resource current actual voltage at the unit's bus terminal; and resource kVAR (kilo-VAR) output. The schedule data used includes the microgrid's scheduled net interchange; the microgrid's load forecast, the microgrid's generation forecast; and resource current kW schedule.

Output data resulting from operation of the smart generation control engine includes the optimal sustained generation dispatch and regulation allocation among all the participating units. This information is updated to the MGMS real-time operational database. The output data also includes the kW set point which is calculated and sent to the corresponding RTU via IFS for each controllable resource.

Figure 7:
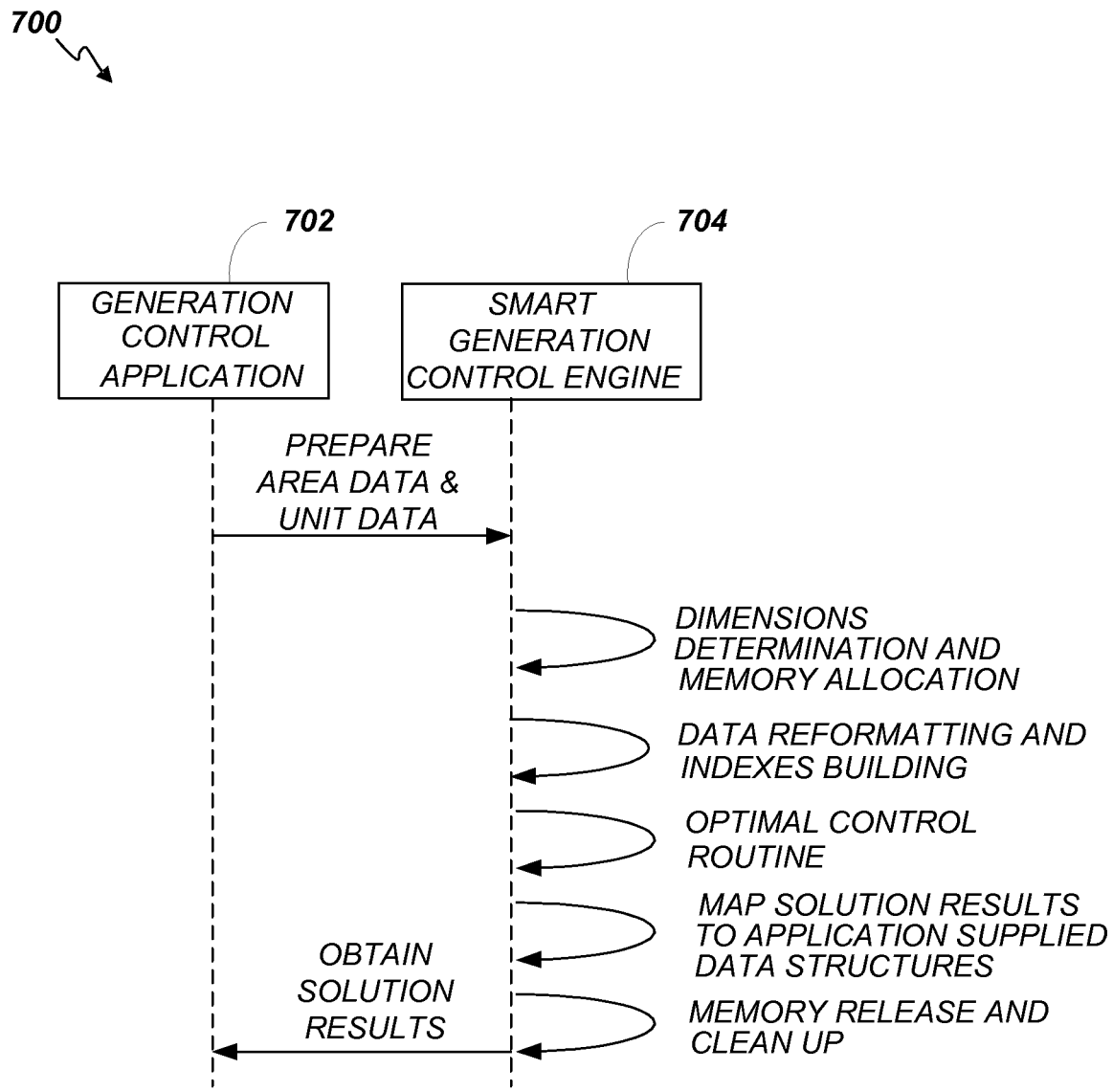
FIG. 7 is a flowchart depicting a second example method according to embodiments of the present invention.
Figure 8:
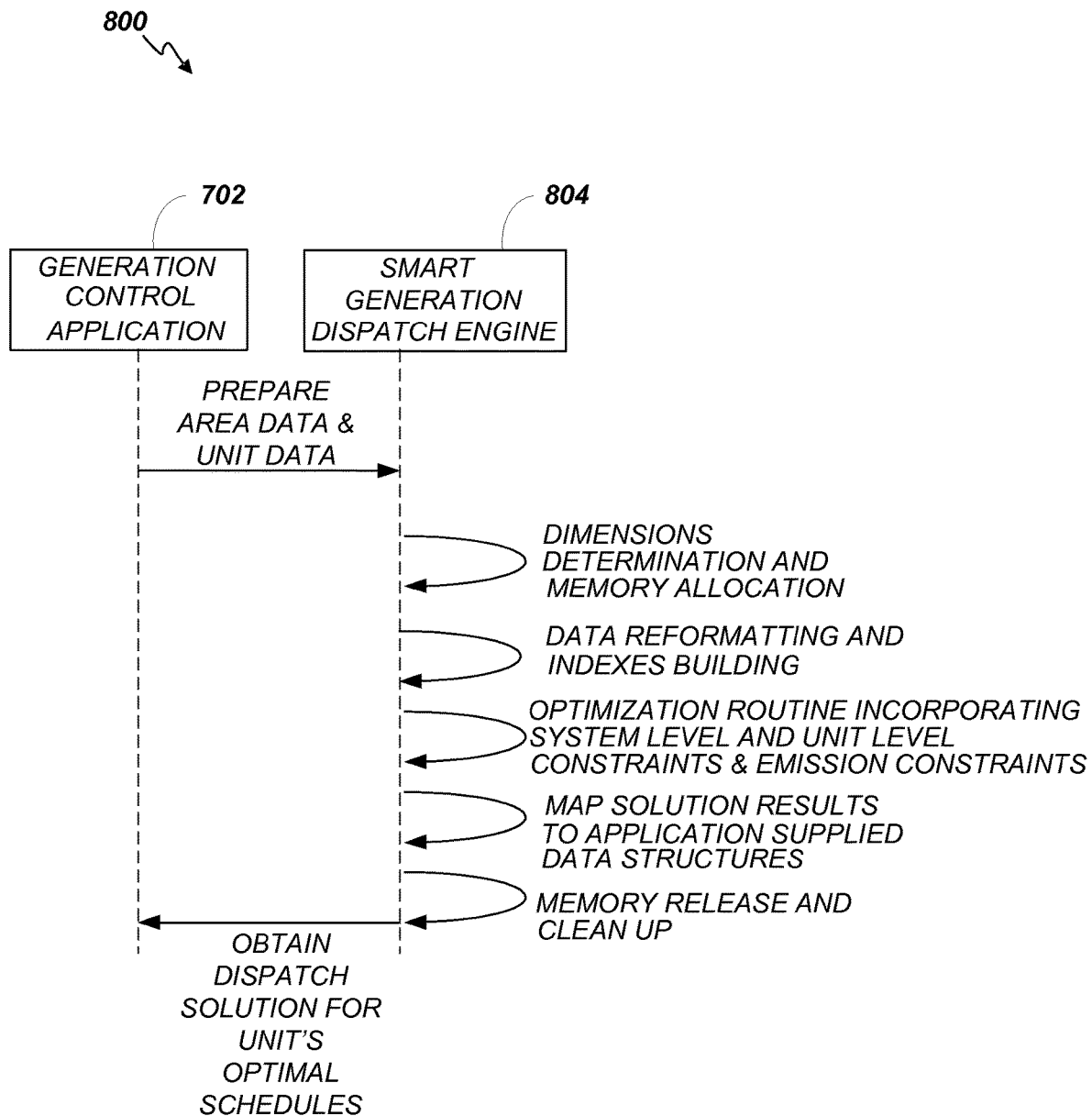
FIG. 8 is a flowchart depicting a third example method according to embodiments of the present invention.

From an implementation perspective, the SGC and the SGD applications each include a generation control application 702 and the SGC includes a SGC engine as shown in the sequence chart 700 of FIG. 7 while the SGD includes a SGD engine 804 as shown in the sequence chart 800 of FIG. 8. The Generation Control application 702 performs data pre-processing and prepares data in a format that can be accepted by the SGC engine 704 and the SGD engine 804. The Generation Control application 702 also obtains the solution results from the engine and does post-processing and stores the results into the operational real-time database.

The SGC engine 704 includes a number of functions/procedures described in detail above and which are callable from within the Generation Control application 702. The SGC engine 704 receives various input data and does optimization and saves the solution results into the application supplied output data structures.

Likewise, the SGD engine 804 includes a number of functions/procedures described in detail above and which are callable from within the Generation Control application 702. The SGD engine 804 receives various input data and does optimization and saves the solution results into the application supplied output data structures.

Numerous embodiments are described in this disclosure, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

The present disclosure is neither a literal description of all embodiments nor a listing of features of the invention that must be present in all embodiments.

The Title (set forth at the beginning of the first page of this disclosure) is not to be taken as limiting in any way as the scope of the disclosed invention(s).

The term "product" means any machine, manufacture and/or composition of matter as contemplated by 35 U.S.C. § 101, unless expressly specified otherwise.

Each process (whether called a method, class behavior, algorithm or otherwise) inherently includes one or more steps, and therefore all references to a "step" or "steps" of a process have an inherent antecedent basis in the mere recitation of the term 'process' or a like term. Accordingly, any reference in a claim to a 'step' or 'steps' of a process has sufficient antecedent basis.

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When a single device, component, structure, or article is described herein, more than one device, component, structure or article (whether or not they cooperate) may alternatively be used in place of the single device, component or article that is described. Accordingly, the functionality that is described as being possessed by a device may alternatively be possessed by more than one device, component or article (whether or not they cooperate).

Similarly, where more than one device, component, structure, or article is described herein (whether or not they cooperate), a single device, component, structure, or article may alternatively be used in place of the more than one device, component, structure, or article that is described. For example, a plurality of computer-based devices may be substituted with a single computer-based device. Accordingly, the various functionality that is described as being possessed by more than one device, component, structure, or article may alternatively be possessed by a single device, component, structure, or article.

The functionality and/or the features of a single device that is described may be alternatively embodied by one or more other devices that are described but are not explicitly described as having such functionality and/or features. Thus, other embodiments need not include the described device itself, but rather can include the one or more other devices which would, in those other embodiments, have such functionality/features.

Devices that are in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

A description of an embodiment with several components or features does not imply that all or even any of such components and/or features are required. On the contrary, a variety of optional components are described to illustrate the wide variety of possible embodiments of the present invention(s). Unless otherwise specified explicitly, no component and/or feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

Although a process may be described as including a plurality of steps, that does not indicate that all or even any of the steps are essential or required. Various other embodiments within the scope of the described invention(s) include other processes that omit some or all of the described steps. Unless otherwise specified explicitly, no step is essential or required.

Although a product may be described as including a plurality of components, aspects, qualities, characteristics and/or features, that does not indicate that all of the plurality are essential or required. Various other embodiments within the scope of the described invention(s) include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category.

Headings of sections provided in this disclosure are for convenience only, and are not to be taken as limiting the disclosure in any way.

"Determining" something can be performed in a variety of manners and therefore the term "determining" (and like terms) includes calculating, computing, deriving, looking up (e.g., in a table, database or data structure), ascertaining, recognizing, and the like.

A "display" as that term is used herein is an area that conveys information to a viewer. The information may be dynamic, in which case, an LCD, LED, CRT, Digital Light Processing (DLP), rear projection, front projection, or the like may be used to form the display.

The present disclosure may refer to a "control system", application, or program. A control system, application, or program, as that term is used herein, may be a computer processor coupled with an operating system, device drivers, and appropriate programs (collectively "software") with instructions to provide the functionality described for the control system. The software is stored in an associated memory device (sometimes referred to as a computer readable medium). While it is contemplated that an appropriately programmed general purpose computer or computing device may be used, it is also contemplated that hard-wired circuitry or custom hardware (e.g., an application specific integrated circuit (ASIC)) may be used in place of, or in combination with, software instructions for implementation of the processes of various embodiments. Thus, embodiments are not limited to any specific combination of hardware and software.

A "processor" means any one or more microprocessors, Central Processing Unit (CPU) devices, computing devices, microcontrollers, digital signal processors, or like devices. Exemplary processors are the INTEL PENTIUM or AMD ATHLON processors.

The term "computer-readable medium" refers to any statutory medium that participates in providing data (e.g., instructions) that may be read by a computer, a processor or a like device. Such a medium may take many forms, including but not limited to non-volatile media, volatile media, and specific statutory types of transmission media. Non-volatile media include, for example, optical or magnetic disks and other persistent memory. Volatile media include DRAM, which typically constitutes the main memory. Statutory types of transmission media include coaxial cables, copper wire and fiber optics, including the wires that comprise a system bus coupled to the processor. Common forms of computer-readable media include, for example, a floppy disk, a flexible disk, hard disk, magnetic tape, any other magnetic medium, a CD-ROM, Digital Video Disc (DVD), any other optical medium, punch cards, paper tape, any other physical medium with patterns of holes, a RAM, a PROM, an EPROM, a FLASH-EEPROM, a USB memory stick, a dongle, any other memory chip or cartridge, a carrier wave, or any other medium from which a computer can read. The terms "computer-readable memory" and/or "tangible media" specifically exclude signals, waves, and wave forms or other intangible or non-transitory media that may nevertheless be readable by a computer.

Various forms of computer readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols. For a more exhaustive list of protocols, the term "network" is defined below and includes many exemplary protocols that are also applicable here.

It will be readily apparent that the various methods and algorithms described herein may be implemented by a control system and/or the instructions of the software may be designed to carry out the processes of the present invention.

Where databases and/or data structures are described, it will be understood by one of ordinary skill in the art that (i) alternative database structures to those described may be readily employed, and (ii) other memory structures besides databases may be readily employed. Any illustrations or descriptions of any sample databases/data structure presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models, hierarchical electronic file structures, and/or distributed databases) could be used to store and manipulate the data types described herein. Likewise, object methods or behaviors of a database can be used to implement various processes, such as those described herein. In addition, the databases may, in a known manner, be stored locally or remotely from a device that accesses data in such a database. Furthermore, while unified databases may be contemplated, it is also possible that the databases may be distributed and/or duplicated amongst a variety of devices.

As used herein a "network" generally refers to an energy delivery network. However, in some embodiments, an information or computing network can be used that provides an environment wherein one or more computing devices may communicate with one another. Such devices may communicate directly or indirectly, via a wired or wireless medium such as the Internet, LAN, WAN or Ethernet (or IEEE 802.3), Token Ring, or via any appropriate communications means or combination of communications means. Exemplary protocols include but are not limited to: Bluetooth™, Time Division Multiple Access (TDMA), Code Division Multiple Access (CDMA), Global System for Mobile communications (GSM), Enhanced Data rates for GSM Evolution (EDGE), General Packet Radio Service (GPRS), Wideband CDMA (WCDMA), Advanced Mobile Phone System (AMPS), Digital AMPS (D-AMPS), IEEE 802.11 (WI-FI), IEEE 802.3, SAP, the best of breed (BOB), system to system (S2S), or the like. Note that if video signals or large files are being sent over the network, a broadband network may be used to alleviate delays associated with the transfer of such large files, however, such is not strictly required. Each of the devices is adapted to communicate on such a communication means. Any number and type of machines may be in communication via the network. Where the network is the Internet, communications over the Internet may be through a website maintained by a computer on a remote server or over an online data network including commercial online service providers, bulletin board systems, and the like. In yet other embodiments, the devices may communicate with one another over RF, cable TV, satellite links, and the like. Where appropriate encryption or other security measures such as logins and passwords may be provided to protect proprietary or confidential information.

Communication among computers and devices may be encrypted to insure privacy and prevent fraud in any of a variety of ways well known in the art. Appropriate cryptographic protocols for bolstering system security are described in Schneier, APPLIED CRYPTOGRAPHY, PROTOCOLS, ALGORITHMS, AND SOURCE CODE IN C, John Wiley & Sons, Inc. 2d ed., 1996, which is incorporated by reference in its entirety.

It will be readily apparent that the various methods and algorithms described herein may be implemented by, e.g., appropriately programmed general purpose computers and computing devices. Typically a processor (e.g., one or more microprocessors) will receive instructions from a memory or like device, and execute those instructions, thereby performing one or more processes defined by those instructions. Further, programs that implement such methods and algorithms may be stored and transmitted using a variety of media (e.g., computer readable media) in a number of manners. In some embodiments, hard-wired circuitry or custom hardware may be used in place of, or in combination with, software instructions for implementation of the processes of various embodiments. Thus, embodiments are not limited to any specific combination of hardware and software. Accordingly, a description of a process likewise describes at least one apparatus for performing the process, and likewise describes at least one computer-readable medium and/or memory for performing the process. The apparatus that performs the process can include components and devices (e.g., a processor, input and output devices) appropriate to perform the process. A computer-readable medium can store program elements appropriate to perform the method.

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application. Applicants intend to file additional applications to pursue patents for subject matter that has been disclosed and enabled but not claimed in the present application.

The foregoing description discloses only exemplary embodiments of the invention. Modifications of the above disclosed apparatus and methods which fall within the scope of the invention will be readily apparent to those of ordinary skill in the art. For example, although the examples discussed above are illustrated for an electricity market, embodiments of the invention can be implemented for other markets.

Accordingly, while the present invention has been disclosed in connection with exemplary embodiments thereof, it should be understood that other embodiments may fall within the spirit and scope of the invention, as defined by the following claims.

What is claimed is:

1. A method of microgrid generation control, the method comprising:
   providing, for a microgrid, a microgrid management system (MGMS) having a smart generation control (SGC) system in communication with a plurality of resources and loads, wherein the plurality of resources and loads are coupled to a microgrid transmission line that is couplable to a macrogrid transmission line;
   performing preprocessing of the resources;
   determining current frequency, interchange, schedule, and area control error (ACE);
   monitoring and continuously controlling the microgrid based on a system mode of the microgrid, a control mode of the microgrid, and a system status;
   deriving a set point for active power control of at least one resource of the plurality of resources;
   transmitting control commands;
   exercising automatic voltage control;
   detecting a forced islanding; and
   monitoring a voltage recovery on the macrogrid transmission line responsive to detecting the forced islanding, to automatically attempt a grid resynchronization;
   wherein when the system mode of the microgrid transitions from a first system mode to a second system mode, an ACE control mode is automatically set based on the second system mode, a current ACE control mode, or the second system mode and the current ACE control mode, such that: when the current ACE control mode is a supervisory mode, and the system mode of the microgrid transitions from a grid connected mode to an island mode, the ACE control mode remains in the supervisory mode; and when the current ACE control mode is a constant interchange mode, and the system mode of the microgrid transitions from a grid connected mode to the island mode, the ACE control mode is automatically set to a constant frequency mode.

2. The method of claim 1 wherein performing preprocessing of the resources includes fetching and filtering a current resource and calculating current resource sustained generation.

3. The method of claim 2 wherein determining current frequency, interchange, schedule, and ACE includes fetching and filtering a current frequency, calculating current interchange and schedule, and calculating ACE.

4. The method of claim 1 wherein monitoring and controlling the microgrid includes determining microgrid system mode and voltage control mode.

5. The method of claim 1 wherein monitoring and controlling the microgrid includes load following resources processing and ACE updating.

6. The method of claim 1 wherein monitoring and controlling the microgrid includes monitoring microgrid voltage; and
   wherein exercising automatic voltage control comprises regulating a voltage of one or more distributed generating resources.

7. The method of claim 1 wherein monitoring and controlling the microgrid includes monitoring microgrid reserves.

8. The method of claim 1 wherein monitoring and controlling the microgrid includes exercising microgrid island frequency control.

9. The method of claim 1 wherein monitoring and controlling the microgrid includes performing microgrid resynchronization to the macrogrid following island voltage recovery.

10. The method of claim 1 further comprising executing smart generation dispatch.

11. The method of claim 1 wherein monitoring and controlling the microgrid includes exercising microgrid voltage/VAR control and kW control.

12. The method of claim 1 wherein monitoring and controlling the microgrid includes exercising microgrid supervisory control.

13. A microgrid management system (MGMS) comprising:
   a process controller;
   a memory coupled to the process controller, the memory having stored therein instructions executable on the process controller, that, when executed by the process controller, cause the MGMS to:
   provide a smart generation control (SGC) system for use with a plurality of resources and loads, wherein the plurality of resources and loads are coupled to a microgrid transmission line that is configured to couple to a macrogrid transmission line;
   perform preprocessing of the plurality of resources;
   determine current frequency, interchange, schedule, and area control error (ACE);
   monitor and continuously control the microgrid based on a system mode of the microgrid, a control mode of the microgrid, and a system status;
   derive a set point for active power control of resources;
   transmit control commands;
   exercise automatic voltage control;
   detect a forced islanding; and
   monitor a voltage recovery on the macrogrid transmission line responsive to the detection of the forced islanding, to automatically attempt a grid resynchronization;

wherein when the system mode of the microgrid transitions from a first system mode to a second system mode, an ACE control mode is automatically set based on the second system mode, a current ACE control mode, or the second system mode and the current ACE control mode, such that: when the current ACE control mode is a supervisory mode, and a system mode of the microgrid transitions from a grid connected mode to an island mode, the ACE control mode remains in the supervisory mode; and when the current ACE control mode is a constant interchange mode, and the system mode of the microgrid transitions from a grid connected mode to the island mode, the ACE control mode is automatically set to a constant frequency mode.

14. The MGMS of claim 13 wherein the instructions to perform preprocessing of the resources include instructions to fetch and filter a current resource and to calculate current resource sustained generation.

15. The MGMS of claim 13 wherein the instructions to determine current frequency, interchange, schedule, and ACE include instructions to fetch and filter a current frequency, to calculate current interchange and schedule, and to calculate ACE.

16. The MGMS of claim 13 wherein the instructions to monitor and control the microgrid include instructions to determine microgrid system mode and voltage control mode.

17. The MGMS of claim 13 wherein the instructions to monitor and control the microgrid includes instructions to perform load-following resources processing and ACE updating.

18. The MGMS of claim 13 wherein the instructions to monitor and control the microgrid includes instructions to monitor microgrid voltage and to exercise automatic voltage control of one or more distributed generating resources.

19. A microgrid system comprising:
a microgrid management system including a smart generation control application and a smart generation dispatch application;
a plurality of resources coupled to the microgrid management system;
a microgrid transmission line coupled to the plurality of resources; and
a plurality of loads coupled to the microgrid transmission line;
wherein, under continuous control of the smart generation control application, the microgrid transmission line is adapted to be coupled to and decoupled from a macrogrid transmission line at a single point,
wherein the microgrid system is adapted to operate in a grid connected mode when the microgrid transmission line is coupled to the macrogrid transmission line,
wherein the microgrid system is adapted to operate in an island mode when the microgrid transmission line is not coupled to the macrogrid transmission line;
wherein the microgrid system is adapted to detect a forced islanding, and is further adapted to monitor a voltage recovery on the macrogrid transmission line responsive to detection of the forced islanding, to automatically attempt a grid resynchronization, and
wherein when a system mode of the microgrid transitions from a first system mode to a second system mode, an ACE control mode is automatically set based on the second system mode, a current ACE control mode, or the second system mode and the current ACE control mode, such that: when the current ACE control mode is a supervisory mode, and the system mode of the microgrid transitions from a grid connected mode to an island mode, the ACE control mode remains in the supervisory mode; and when the current ACE control mode is a constant interchange mode, and the system mode of the microgrid transitions from a grid connected mode to the island mode, the ACE control mode is automatically set to a constant frequency mode.

20. The microgrid system of claim 19 wherein the smart generation control application is configured to receive operator-selected constraints; and is further configured to modify power generation operations based at least in part on the operator-selected constraints.

* * * * *